United States Patent
Kobayashi

(10) Patent No.: US 10,268,187 B2
(45) Date of Patent: Apr. 23, 2019

(54) MANUFACTURING CELL MACHINE MANAGEMENT SYSTEM BASED ON COMPONENT DEGREE OF CONSUMPTION

(71) Applicant: FANUC CORPORATION, Yamanashi (JP)

(72) Inventor: Masanori Kobayashi, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 83 days.

(21) Appl. No.: 15/480,370

(22) Filed: Apr. 6, 2017

(65) Prior Publication Data

US 2017/0293289 A1    Oct. 12, 2017

(30) Foreign Application Priority Data

Apr. 8, 2016   (JP) .................. 2016-078371

(51) Int. Cl.
G05B 19/418    (2006.01)
(52) U.S. Cl.
CPC ... G05B 19/4188 (2013.01); G05B 19/41865 (2013.01); *G05B 2219/31069* (2013.01); *G05B 2219/32268* (2013.01); *Y02P 90/20* (2015.11)
(58) Field of Classification Search
None
See application file for complete search history.

(56) References Cited

U.S. PATENT DOCUMENTS 4,870,592 A * 9/1989 Lampi ................ G05B 19/4189
700/112

6,353,767 B1 * 3/2002 Wakeman ............ G06Q 30/02
700/91

(Continued)

FOREIGN PATENT DOCUMENTS

JP    2-284210 A    11/1990
JP    4-69702 A    3/1992

(Continued)

OTHER PUBLICATIONS

Chung et al. 'The selection of tools and machines on web-based manufacturing environments' Int J Machine Tools & Manufacture 4 4317-326 (2004).*

*Primary Examiner* — Bernard G Lindsay
(74) *Attorney, Agent, or Firm* — Hauptman Ham, LLP

(57) ABSTRACT

A manufacturing management system capable of appropriately evaluating a degree of consumption of each component of a manufacturing machine, and efficiently operating a manufacturing cell including the manufacturing machines. A control unit of a cell controller has: a manufacturing machine information receiving part configured to receive manufacturing machine information regarding an operational history of each component constituting the manufacturing machine; a component degree of consumption calculating part configured to calculate a weighed degree of consumption of each component, based on the manufacturing machine information and a predetermined weight of each component; a manufacturing machine degree of consumption calculating part configured to calculate a degree of consumption of each manufacturing machine, based on the weighed degree of consumption of each component; and a manufacturing machine selecting part configured to select a manufacturing machine to be used in the manufacturing cell, based on the degree of consumption of each manufacturing machine.

2 Claims, 3 Drawing Sheets

(56) References Cited

U.S. PATENT DOCUMENTS

| | | | |
|---|---|---|---|
| 6,591,157 B1 * | 7/2003 | Vivirito | B26D 5/00 700/175 |
| 2002/0013639 A1 * | 1/2002 | Fujishima | B23Q 41/08 700/175 |

FOREIGN PATENT DOCUMENTS

| JP | 5-37490 U | 5/1993 |
|---|---|---|
| JP | 5-233004 A | 9/1993 |
| JP | 6-131021 A | 5/1994 |
| JP | 7-105285 A | 4/1995 |
| JP | 11-239954 A | 9/1999 |
| JP | 2001-031231 A | 2/2001 |
| JP | 2001-312311 A | 11/2001 |
| JP | 2001-350510 A | 12/2001 |

* cited by examiner

MANUFACTURING CELL MACHINE MANAGEMENT SYSTEM BASED ON COMPONENT DEGREE OF CONSUMPTION

RELATED APPLICATIONS

The present application claims priority to Japanese Patent Application No. 2016-078371 filed Apr. 8, 2016, the disclosures of which is hereby incorporated by reference herein in its entirety.

BACKGROUND OF THE INVENTION

1. Field of the Invention

The preset invention relates to a manufacturing management system for efficiently operating a manufacturing cell including a plurality of manufacturing machines.

2. Description of the Related Art

In a manufacturing management system (or a cell control system) for managing a manufacturing cell constituted from a plurality of manufacturing machines, it is desired to efficiently operate the manufacturing cell by managing an operation status of each manufacturing machine and by judging as to which manufacturing machine is to be used. For example, if some manufacturing machines can be used, a manufacturing machine having a high production rate is preferentially selected when a delivery period is short, or, a manufacturing machine having a low defect rate of product is preferentially selected when a stock of raw material is relatively small. In another situation, or when there is no difference in performance between each machine, a manufacturing machine having a less operating time may be selected, in order to lengthen maintenance intervals and increase working rate (or reduce down-time) of the manufacturing cell.

As a relevant prior art document, JP H04-069702 A discloses a technique to select a work facility among a plurality of available work facilities, according to a degree of priority (decision rule) determined from a predetermined priority, an operating time (or down-time), the number of functions, and working velocity, etc.

JP H06-131021 A discloses a method for controlling two robots which are intended to be operated while increasing availability ratios thereof as much as possible, by repeating processes of: searching an executable part of a job with reference to a status of a process line; selecting a robot based on preference order; and, if the remaining robot is not being used, executing the part of the job by the selected robot and searching another part of the job for the remaining robot, or, if the remaining robot is being used, checking as to whether the part of the job can be simultaneously executed, and executing the part of the job and preparing the next part of the job when these parts of the job can be simultaneously executed, or searching another part of the job for the selected robot when the parts of the job cannot be simultaneously executed.

JP 2001-350510 A discloses a management system constituted from a plurality of machine tools and a management apparatus connected to the machine tools. This documents describes that the management apparatus has: a life judging part configured to receive data regarding an operational status of each drive mechanism of the machine tool from a controller thereof, and evaluates a degree of consumption of each drive mechanism based on the received data; a storing part configured to store data regarding the degree of consumption evaluated by the life judging part; and an outputting part configured to output the data regarding the degree of consumption stored in the storing part.

JP H07-105285 A discloses a system for monitoring an operational status of a manufacturing line, configured to collect data representing an operational status of equipment for processing a product on the manufacturing line in real-time, the data including information of operative/inoperative, the number of processed products, and the number of defective products, etc.). The system has a means for calculating and outputting an availability ratio, performance efficiency, defect rate, and overall efficiency of the equipment, based on the data.

Further, JP H02-284210 A discloses a technique to: calculate an operating time or frequency of use of a processing machine or components constituting a CNC controller for controlling the processing machine; demand exchange of each component before the component reaches the end of its life-cycle; and select a specified component among the components and excluding it from an object to be managed, in order to extend an average life of the object such as the CNC controller.

In some cases, a manufacturing machine having a short operating time may be selected in order to reduce a frequency of maintenance of the manufacturing cell and extend a period of time (or a machine life) in which the manufacturing cell can be continuously used. However, in the prior art, operating time of the entire machine is used as a reference time, and operating time of each of the components constituting the machine is not considered. For example, even when a manufacturing machine having a short operating time is selected, a specified component of the machine may be intensively used, resulting in a malfunction of the specified component.

In addition, when one manufacturing machine includes a component requiring a lot of time and effort for maintenance or repairing the component, and another component capable of being easily and promptly maintained or repaired, the former component has much greater effect on the availability ratio of the manufacturing machine than the latter component. However, in the prior art, a means for preferentially avoiding the maintenance of the former component has not been proposed.

SUMMARY OF THE INVENTION

Therefore, an object of the present invention is to provide a manufacturing management system capable of appropriately evaluating a degree of consumption of each component of a manufacturing machine, and efficiently operating a manufacturing cell including a plurality of manufacturing machines.

One aspect of the present invention provides a manufacturing management system for managing a manufacturing cell including a plurality of manufacturing machines, based on production schedule information from a production scheduling device, the manufacturing management system comprising: a manufacturing machine information receiving part configured to receive manufacturing machine information regarding an operational history of each of components constituting the manufacturing machine; a component degree of consumption calculating part configured to calculate a weighed degree of consumption of each component, based on the manufacturing machine information and a predetermined weight of each component; a manufacturing machine degree of consumption calculating part configured to calculate a degree of consumption of each of the manufacturing machines, based on the weighed degree of consumption of each component calculated by the component degree of consumption calculating part; and a manufacturing machine selecting part configured to select a manufacturing machine to be used in the manufacturing cell, based on the degree of consumption of each manufacturing machine calculated by the manufacturing machine degree of consumption calculating part.

In a preferred embodiment, the manufacturing machine selecting part is configured to, among the plurality of manufacturing machines, exclude a manufacturing machine including a component having the weighed degree of consumption higher than a predetermined threshold or including a component having the highest weighed degree of consumption, from a candidate of the manufacturing machine to be used in the manufacturing cell.

In a preferred embodiment, the component degree of consumption calculating part is configured to estimate the weighed degree of consumption of each component, based on the production schedule information, wherein the manufacturing machine selecting part is configured to, among the plurality of manufacturing machines, exclude a manufacturing machine including a component having the estimated weighed degree of consumption higher than a predetermined threshold or including a component having the highest estimated weighed degree of consumption, from a candidate of the manufacturing machine to be used in the manufacturing cell.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTIONS

Figure 1:
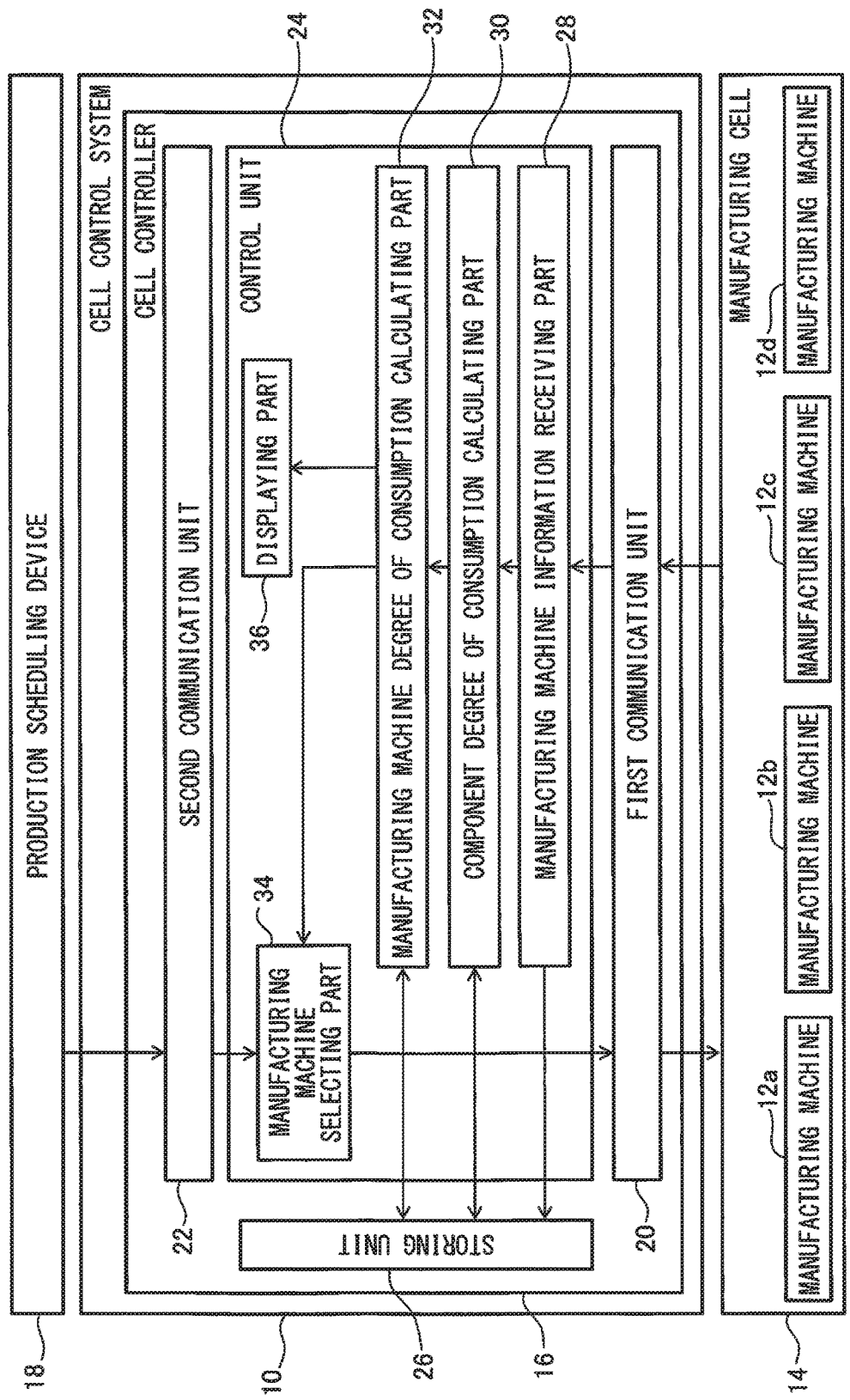
FIG. 1 is a block diagram showing a schematic configuration of a manufacturing management system according to a preferred embodiment of the present invention.

Hereinafter, a preferred embodiment of the present invention will be explained with reference to the drawings. FIG. 1 is a block diagram showing a schematic configuration of a manufacturing management system (or cell control system) 10 according to a preferred embodiment of the present invention. Manufacturing management system 10 has a cell controller 16 configured to communicate with a manufacturing cell 14 including a plurality of (in the illustrated embodiment, four) manufacturing machines 12a, 12b, 12c and 12d. Manufacturing management system 10 is configured to manage and control manufacturing cell 14 based on production schedule information received from a production scheduling device 18 configured to communicate with cell controller 16.

For example, each of manufacturing machines 12a to 12d included in manufacturing cell 14 may be a machine tool or a (multi-joint) robot, configured to carry out an operation regarding predetermined manufacturing. In many cases, the manufacturing machines are operated based on a program provided to manufacturing cell 14. Although the manufacturing machines may be identical to or different from each other, at least two manufacturing machines are configured to carry out a common operation, and cell controller 16 is configured to select and command as to which manufacturing machine should carry out the common operation.

In this embodiment, manufacturing cell 14 may be installed in a factory, etc., for manufacturing a product. On the other hand, cell controller 16 and production scheduling device 18 may be installed in a building, etc., which is different from the factory. In this case, cell controller 16 and manufacturing cell 14 can be connected to each other by a network (or first communication unit 20) such as an intranet, so that a manufacturing instruction, etc., from cell controller 16 can be transmitted to manufacturing cell 14. Further, from manufacturing cell 14, data regarding a status and/or production result of each manufacturing machine of manufacturing cell 14, and data regarding an operational history (result) of each of components constituting each manufacturing machine, can be transmitted to cell controller 16.

For example, production scheduling device 18 may be a personal computer and may be installed in an office, etc., which is different from the factory. In this case, production scheduling device 18 may be communicably connected to cell controller 16 by a network (or second communication unit 22) such as an internet, so that the a production schedule, etc., can be transmitted from production scheduling device 18 to cell controller 16. Further, from cell controller 16, the data regarding the status and/or production result of each manufacturing machine of manufacturing cell 14 can be transmitted to production scheduling device 18.

First communication unit 20 may be any device as long as it communicably connects cell controller 16 to manufacturing cell 14. Also, second communication unit 22 may be any device as long as it communicably connects cell controller 16 to production scheduling device 18.

Cell controller 16 has, in addition to first and second communication units 20 and 22, a control unit 24 and a storing unit 26 such as a memory. Control unit 24 has: a manufacturing machine information receiving part 28, such as a communication module, configured to receive manufacturing machine information regarding the operational history of each of components (as explained below) constituting each of manufacturing machines 12a to 12d; a component degree of consumption calculating part 30 configured to calculate a (weighed) degree of consumption of each component of manufacturing machines 12a to 12d, based on the manufacturing machine information and a predetermined weight of each component; a manufacturing machine degree of consumption calculating part 32 configured to calculate a (manufacturing machine) degree of consumption of each of manufacturing machines 12a to 12d, based on the weighed degree of consumption of each component calculated by component degree of consumption calculating part 30; and a manufacturing machine selecting part 34 configured to select a manufacturing machine to be used in manufacturing cell 14, based on the manufacturing machine degree of consumption of each manufacturing machine calculated by manufacturing machine degree of consumption calculating part 32. Optionally, component degree of consumption calculating part 30 may have a function for estimating the weighed degree of consumption of each component based on the production schedule. In addition, the respective functions of component degree of consumption calculating part 30, manufacturing machine degree of consumption calculating part 32 and manufacturing machine selecting part 34 may be realized by a processor, such as a CPU incorporated in control unit 24.

Figure 2:
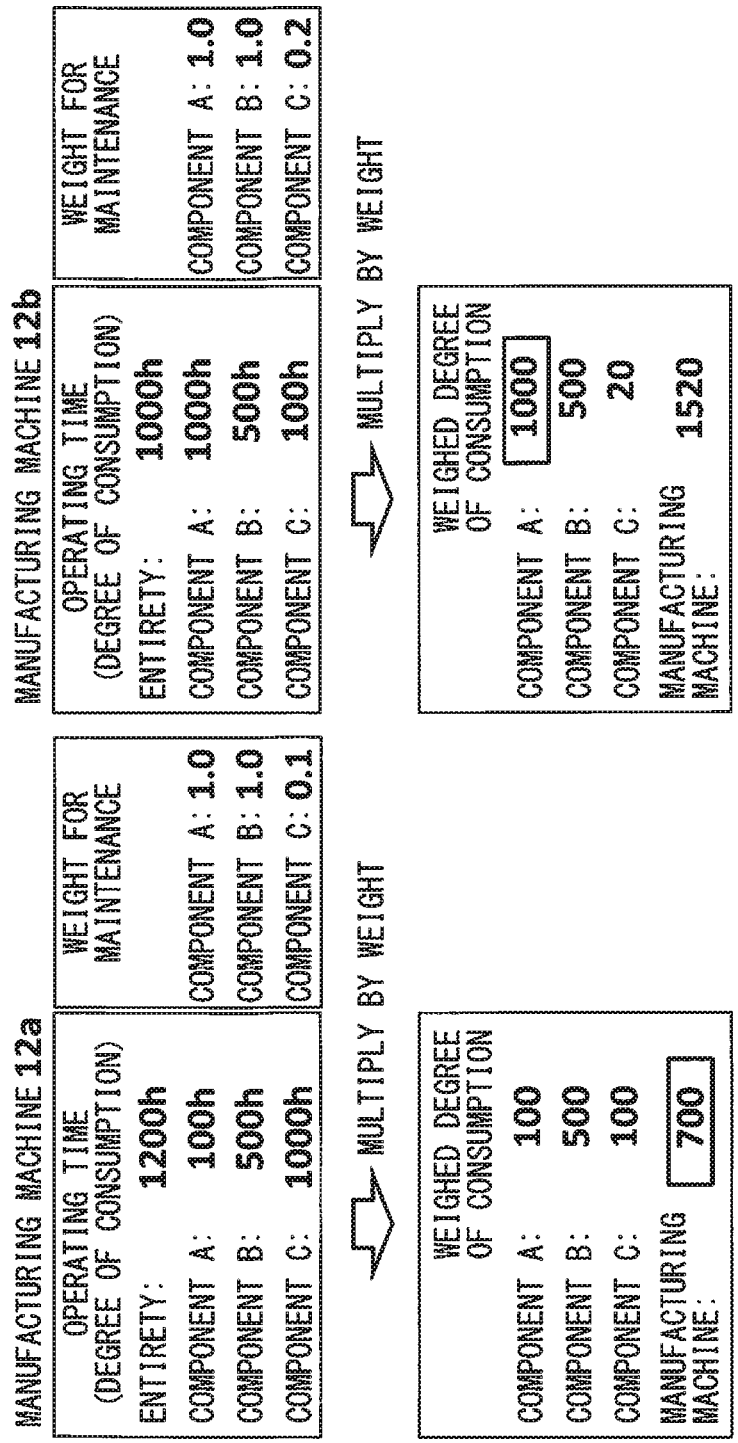
FIG. 2 shows an example of a procedure for calculating a degree of consumption in the manufacturing management system of FIG. 1.

Next, a concrete example of the procedure in the manufacturing management system of the embodiment will be explained. FIG. 2 shows a table representing manufacturing machine information including an operating time of the entire manufacturing machine, and an operating time of a plurality of (in this case, three) components A, B and C constituting each manufacturing machine, with respect to manufacturing machines 12a and 12b of manufacturing cell 14, at a certain time point. Such manufacturing machine information may be displayed on a proper indicator (for example, an indicating part 36 such as a display of cell controller 16).

Hereinafter, the operating time (use time) of each component will be explained as representing the degree of consumption (also referred to as the simple degree of consumption, in comparison to the weighed degree of consumption as explained below). In this regard, as the simple degree of consumption, the operating time, the number of operations or the amount of movement of each component, or a combination thereof, may be used. Therefore, these factors may be used as the manufacturing machine information. In addition, when the combination is used, the operating time, the number of operations and the amount of movement may be multiplied by respective weights (for example, experimentally determined weights), and then a value obtained by adding the operating time, the number of operations and the amount of movement after being multiplied by the respective weights may be used as the simple degree of consumption.

The motion of each component of the manufacturing machine may be controlled by a numerical controller or a PLC (PMC). Therefore, the operating time, etc. of each component can be measured by providing a function for calculating the operating time (or the number of operations or the amount of movement) of each component to control software of the numerical controller or the PLC (PMC). Otherwise, since the numerical controller or the PLC (PMC) is operated based on a command in a program, the operating time of each component may be estimated analyzing (simulating) the program. In addition, the numerical controller or the PLC (PMC) already has information regarding as to which component the measured or estimated operating time, the number of operations or the amount of movement is associated with. For example, a program command "G00X" is associated with an X-axis, and a program command "M06" is associated with a tool exchanger. Information regarding such relationship may be previously stored in the numerical controller or the PLC (PMC).

Components A, B and C are classified based on a time or an amount of labor required for maintenance thereof. For example, components A and B may be relatively large and heavy components located deep in the machine, such as a basic structure (e.g., X-, Y- and Z-axes) of a machining center, and thus maintenance of components A and B takes a lot of time and effort. On the other hand, component C may be a relatively small and light component located in front of the machine, such as a peripheral equipment (e.g., a tool exchanger or a coolant supply unit), and thus maintenance of component C is easily carried out. Other than the above components, a relatively heavy component located in front of the machine, such as a spindle or a rotating table mounted on the X-, Y- or Z-axis, (i.e., the time and effort required for the maintenance thereof are medium degree) may be used.

As shown in FIG. 2, when comparing manufacturing machines 12a and 12b to each other, the entire operating time of machine 12b is shorter than that of machine 12a. Therefore, based on the entire operating time, machine 12b is selected as the manufacturing machine for carrying out the next operation. However, when comparing respective components A requiring a lot of time and effort for the maintenance of each other, the operating time of component A of machine 12b is longer than that of machine 12a. Therefore, when machine 12b is selected, it is more likely that the maintenance of component A of machine 12b must be early carried out. As a result, the availability ratio in this case becomes shorter than a case when machine 12a is selected. For example, manufacturing machine 12b is further operated by 500 hours from the state of FIG. 2, the operating time of component A of machine 12b will become 1500 hours, which means that the degree of consumption of component A is significantly increased (i.e., the maintenance of component A must be immediately carried out).

In view of the above, in the embodiment, a weighed degree of consumption of each component is calculated by multiplying the operating time (or the simple degree of consumption) of each component by a predetermined weight for maintenance. Then, the degree of consumption of each manufacturing machine is calculated by summing the weighed degree of consumption of each component. Concretely, a large weight (in this case, 1.0) is set for components A and B requiring a lot of time and effort for the maintenance, and a small weight (in this case, 0.1 for machine 12a and 0.2 for machine 12b) is set for component C the maintenance of which is easily carried out. In this regard, a value of the weight may be experimentally determined, and may be modified by accumulated data.

As a result of calculating the weighed degree of consumption of each component by using the above weight, and summing them, the degree of consumption of manufacturing machines 12a and 12b are obtained as 700 and 1520, respectively, in the example of FIG. 2. Accordingly, by comparing manufacturing machines 12a and 12b, machine 12a having the smaller manufacturing machine degree of consumption is selected as the machine to be used in the next process, etc. As explained above, in the embodiment, the degree of consumption of each component is appropriately calculated or evaluated based on the level of difficulty of the maintenance, etc., and then the degree of each manufacturing machine based on the degree of consumption of each component, whereby a frequency of the maintenance of the component requiring a lot of time and effort for the maintenance can be significantly reduced. Therefore, a maintenance interval of each manufacturing machine can be lengthened, and a ratio of the operating time relative to the maintenance time can be increased, whereby the entire manufacturing cell can be made highly efficient. Further, a maintenance cost of the manufacturing cell can be significantly reduced.

In the above embodiment, before selecting the manufacturing machine having the lowest manufacturing machine degree of consumption, a manufacturing machine among the plurality of manufacturing machines, including a component having the weighed degree of consumption higher than a predetermined threshold and/or a component having the highest weighed degree of consumption, may be previously excluded from a candidate of the manufacturing machine to be used in the manufacturing cell. In the example of FIG. 2, manufacturing machine 12b including component A having the highest weighed degree of consumption (=1000) can be excluded. Otherwise, when the threshold is determined to 800, for example, manufacturing machine 12b including component A having the weighed degree of consumption higher than the threshold will also be excluded. As such, by excluding the manufacturing machine which satisfies the predetermined condition, before selecting the manufacturing machine based on the manufacturing machine degree of consumption, the manufacturing machine to be used can be selected more effectively.

Figure 3:
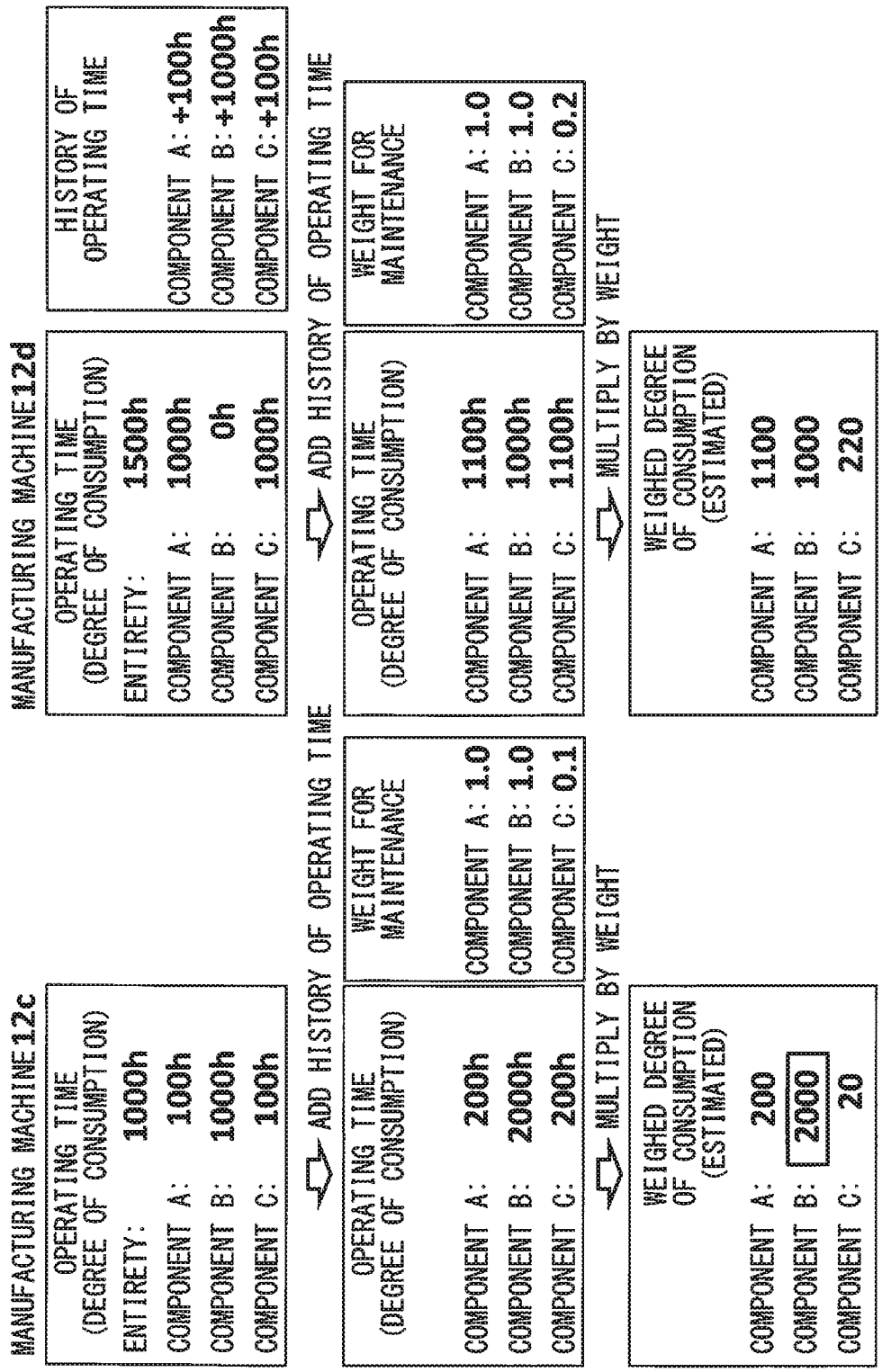
FIG. 3 shows another example of a procedure for calculating a degree of consumption in the manufacturing management system of FIG. 1.

FIG. 3 shows a table representing manufacturing machine information including an operating time of the entire manufacturing machine, and an operating time of a plurality of (in this case, three) components A, B and C constituting each manufacturing machine, with respect to manufacturing machines 12c and 12d of manufacturing cell 14, at a certain time point. Similarly to FIG. 2, such manufacturing machine information may be displayed on a proper indicator (for example, indicating part 36 such as a display of cell controller 16).

As shown in FIG. 3, when comparing manufacturing machines 12c and 12d to each other, the entire operating time of machine 12c is shorter than that of machine 12d. Therefore, based on the entire operating time, machine 12b is selected as the manufacturing machine for carrying out the next operation. However, when adding an operating time predicted from the past result (history) to the current operating time, the operating time of one or more component (in the example of FIG. 3, component B of manufacturing machine 12c) may be significantly increased, whereby it may be necessary to immediately carry out the maintenance of the component.

Therefore, when selecting the manufacturing machine to be used, it may be preferable that the degree of consumption of the manufacturing machine be calculated by estimating a future degree of consumption of the component and then using the estimated degree of consumption and the above weight. Concretely, in this case, if each manufacturing machine is operated based on a commanded manufacturing content from production scheduling device 18, the operating times of components A, B and C will be increased by 100 hours, 1000 hours and 100 hours, respectively.

Before calculating (estimating) the weighed degree of consumption of each component of each manufacturing machine based on the increased operating time so as to select the manufacturing machine having the lowest manufacturing machine degree of consumption, a manufacturing machine among the plurality of manufacturing machines, including a component having the estimated weighed degree of consumption higher than a predetermined threshold and/or a component having the highest estimated weighed degree of consumption, may be previously excluded from a candidate of the manufacturing machine to be used in the manufacturing cell. In the example of FIG. 3, manufacturing machine 12c including component B having the highest estimated weighed degree of consumption (=2000) can be excluded. Otherwise, when the threshold is determined to 1500, for example, manufacturing machine 12c including component B having the estimated weighed degree of consumption higher than the threshold will also be excluded. As such, by estimating the future degree of consumption based on the production schedule and excluding the manufacturing machine which satisfies the predetermined condition, before selecting the manufacturing machine based on the manufacturing machine degree of consumption, the manufacturing machine to be used can be selected more effectively.

In the example of FIG. 3, the weighed degree of consumption of the component of each manufacturing machine may be estimated based on the production schedule information from production scheduling device 18. Otherwise, the production schedule information previously including the past result (history) of the component may be used as the weighed degree of consumption of the component. For example, a command program in the production schedule information for operating the manufacturing machine may include a command for instructing which component, where and how fast the component should be moved, and/or a command for starting or stopping the operation of each component. Therefore, when the weighed degree of consumption of the component is estimated from the production schedule information, the number of operations, the operating time, and the amount of movement of each component can be calculated or acquired by simulating the command program.

In the examples explained with reference to FIGS. 2 and 3, based on the weighed degree of consumption of each component of the manufacturing machine, the degree of consumption of the manufacturing machine is calculated, and/or the manufacturing machine including the component having the high weighed degree of consumption is excluded. Additionally, a criterion (or criteria) other than the manufacturing machine degree of consumption (e.g., a production rate and/or manufacturing failure rate) may be further set, so that the criterion (criteria) is also considered when selecting the manufacturing machine to be used. For example, a degree of priority may be added to each criterion, or a parameter obtained by adding a weight to each criterion may be used. In addition, the degree of priority and/or the weight may be included in the production schedule information, and may be changed depending on the manufacturing condition.

According to the present invention, the degree of consumption of the component constituting each of the manufacturing machines can be appropriately quantified, and then the degree of consumption of the manufacturing machine can be calculated. Therefore, it can be adequately judged as to which manufacturing machine should be used, in comparison to the prior art, whereby the manufacturing machine and the component thereof can be evenly used with respect to the operating time. As a result, the maintenance interval of the manufacturing cell can be significantly extended in comparison to the prior art, and the availability ratio of the manufacturing machine can be increased. Further, the maintenance cost of the manufacturing machine can be reduced.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A manufacturing management system for managing a manufacturing cell including a plurality of manufacturing machines, based on production schedule information from a production scheduling device, the manufacturing management system comprising:
  a manufacturing machine information receiving part configured to receive manufacturing machine information regarding an operational history of each of components constituting each of the plurality of manufacturing machines;
  a component degree of consumption calculating part configured to calculate a weighted degree of consumption of each component, based on the manufacturing machine information and a predetermined weight regarding easiness of maintenance of each component, wherein the easiness of maintenance is based on at least one of a size, a weight or a location of said component in the corresponding manufacturing machine;

a manufacturing machine degree of consumption calculating part configured to calculate a degree of consumption of each of the plurality of manufacturing machines, based on the weighted degree of consumption of each component calculated by the component degree of consumption calculating part; and a manufacturing machine selecting part comprising a processor, wherein at least two of the plurality of manufacturing machines are configured to perform a common manufacturing operation, the processor of the manufacturing machine selecting part is configured to select a manufacturing machine, among said at least two manufacturing machines, to perform the common manufacturing operation, based on the degree of consumption of each manufacturing machine calculated by the manufacturing machine degree of consumption calculating part, the manufacturing machine selected by the processor of the manufacturing machine selecting part is caused to carry out the common manufacturing operation, and the processor of the manufacturing machine selecting part is configured to, among the plurality of manufacturing machines, exclude a manufacturing machine including a component having the weighted degree of consumption higher than a predetermined threshold or including a component having the highest weighted degree of consumption, from being a candidate manufacturing machine to perform the common manufacturing operation.

2. The manufacturing management system as set forth in claim 1, wherein the component degree of consumption calculating part is configured to estimate the weighted degree of consumption of each component based on the production schedule information.

* * * * *